(12) United States Patent
Brown

(10) Patent No.: US 10,933,478 B2
(45) Date of Patent: Mar. 2, 2021

(54) DECKING TOOL

(71) Applicant: VERCO DECKING INC., Phoenix, AZ (US)

(72) Inventor: Christopher Lawrence Brown, Whittier, CA (US)

(73) Assignee: VERCO DECKING INC., Phoenix, AZ (US)

( * ) Notice: Subject to any disclaimer, the term of this patent is extended or adjusted under 35 U.S.C. 154(b) by 0 days.

(21) Appl. No.: 15/892,796

(22) Filed: Feb. 9, 2018

(65) Prior Publication Data

US 2018/0229316 A1 Aug. 16, 2018

Related U.S. Application Data

(60) Provisional application No. 62/457,922, filed on Feb. 12, 2017.

(51) Int. Cl.
*B23D 29/00* (2006.01)
*B23D 17/08* (2006.01)
(Continued)

(52) U.S. Cl.
CPC ............ *B23D 29/00* (2013.01); *B23D 17/08* (2013.01); *E04G 21/167* (2013.01); *E04B 5/36* (2013.01)

(58) Field of Classification Search
CPC .... B23D 29/005; B23D 29/00; B21D 39/021; B21D 39/03; B21D 39/034; B21D 39/02;
(Continued)

(56) References Cited

U.S. PATENT DOCUMENTS 1,743,209 A * 1/1930 Groehn .................. B21J 15/04
72/451
1,949,718 A 3/1934 Jackson
(Continued)

FOREIGN PATENT DOCUMENTS

DE 2418009 10/1974
DE 2423226 11/1975
(Continued)

OTHER PUBLICATIONS

International Search Report and Written Opinion dated May 2, 2018 for International Patent Application No. PCT/US18/17670.
(Continued)

*Primary Examiner* — Jason Daniel Prone
(74) *Attorney, Agent, or Firm* — Moore & Van Allen PLLC; Jeffrey R. Gray

(57) ABSTRACT

The present invention relates to a tool for forming a joint in an interlocking side-lapped seam formed between first and second structural decking panels. The decking tool may include a frame, actuator, and arms with jaws, wherein the actuator forms a structural component of the decking tool and is located between the frame and the arms with the jaws. Moreover, the decking tool may further comprise one or more shields and jaw guards. The one or more shields may cover the arms on at least one side for protection. The one or more jaw guards may be utilized with or without the shields, and may or may not be integral with the shields. The one or more jaw guards have a number of benefits, such as protecting the jaws, positioning the jaws, being utilized as levers to help remove the jaws, and being utilized to prevent separation of the side-lap seam.

10 Claims, 12 Drawing Sheets

(51) Int. Cl.
  *E04G 21/16* (2006.01)
  *E04B 5/36* (2006.01)

(58) Field of Classification Search
  CPC .... B21D 39/025; B21D 39/026; B25B 27/00;
         E04D 15/02; E04D 15/04
  USPC .... 30/228, 379, 379.5; 72/409.12, 451, 450,
         72/407, 453.16, 453.15; D8/61
  See application file for complete search history.

(56) References Cited

U.S. PATENT DOCUMENTS

| | | | | |
|---|---|---|---|---|
| 1,956,797 | A | 5/1934 | Jackson | |
| 2,620,879 | A | 12/1952 | Fechter | |
| 2,819,643 | A | 1/1958 | Walker | |
| 2,829,714 | A | 4/1958 | Kalb | |
| 2,840,905 | A | 7/1958 | Geiger | |
| 2,874,666 | A | 2/1959 | Thor | |
| 2,931,260 | A * | 4/1960 | Townshend, Jr. | H01R 43/042 72/409.01 |
| 2,992,576 | A * | 7/1961 | Evans et al. | H01R 43/042 72/409.08 |
| 2,996,939 | A * | 8/1961 | Meier | B65B 13/188 81/301 |
| 3,163,931 | A | 1/1965 | Nielsen | |
| 3,178,806 | A | 4/1965 | Keith | |
| 3,213,583 | A | 10/1965 | Winski | |
| 3,312,028 | A | 4/1967 | Schroyer | |
| 3,358,541 | A * | 12/1967 | Frei | B23D 29/002 30/228 |
| 3,410,129 | A | 11/1968 | Werner | |
| 3,411,339 | A | 11/1968 | Brown | |
| 3,427,837 | A * | 2/1969 | Faulconer | H01R 43/0427 72/407 |
| 3,473,362 | A | 10/1969 | Black | |
| 3,474,585 | A | 10/1969 | Foster | |
| 3,575,037 | A | 4/1971 | Porter | |
| 3,624,876 | A * | 12/1971 | Irvin | B21D 39/00 72/409.12 |
| 3,641,729 | A | 2/1972 | Irvin | |
| 3,685,336 | A | 8/1972 | Black, Jr. | |
| 3,714,688 | A | 2/1973 | Olson | |
| 3,728,779 | A | 4/1973 | Behlen et al. | |
| 3,877,280 | A | 4/1975 | Cornell | |
| 3,877,286 | A | 4/1975 | Fontaine et al. | |
| 4,037,512 | A | 7/1977 | Sundberg | |
| 4,072,118 | A | 2/1978 | Schultheiss | |
| 4,078,766 | A | 3/1978 | Saurwein | |
| 4,171,599 | A | 10/1979 | Lipp | |
| 4,186,535 | A | 2/1980 | Morton | |
| 4,275,584 | A * | 6/1981 | Kruschel | B65B 13/345 72/409.11 |
| 4,307,553 | A | 12/1981 | Puckett | |
| 4,353,240 | A | 10/1982 | Undin et al. | |
| 4,375,161 | A | 3/1983 | Braun et al. | |
| 4,392,295 | A | 7/1983 | Sasai et al. | |
| 4,442,581 | A | 4/1984 | Molnick | |
| 4,459,735 | A | 7/1984 | Sawdon | |
| 4,473,925 | A | 10/1984 | Jansen | |
| 4,531,289 | A * | 7/1985 | Brick | A62B 3/005 72/392 |
| 4,531,397 | A | 7/1985 | Pratt | |
| 4,558,584 | A | 12/1985 | Myers | |
| 4,671,721 | A | 6/1987 | Pratt et al. | |
| 4,757,609 | A | 7/1988 | Sawdon | |
| 4,821,419 | A | 4/1989 | Lee | |
| 4,893,493 | A | 1/1990 | Jacques et al. | |
| 4,918,898 | A | 4/1990 | McLeod, Jr. | |
| 4,986,691 | A | 1/1991 | Hafner | |
| 4,989,438 | A | 2/1991 | Simon | |
| 4,998,351 | A | 3/1991 | Hartmister | |
| 5,012,666 | A | 5/1991 | Chen et al. | |
| 5,020,355 | A * | 6/1991 | Payne | B25B 27/146 72/409.04 |
| 5,022,253 | A | 6/1991 | Parlatore | |
| 5,165,213 | A | 11/1992 | Finch et al. | |
| 5,177,861 | A | 1/1993 | Sawdon | |
| 5,208,973 | A | 5/1993 | Sawdon | |
| 5,221,183 | A | 6/1993 | Hoeffken | |
| 5,312,218 | A | 5/1994 | Pratt et al. | |
| 5,381,686 | A | 1/1995 | Thorup | |
| 5,431,089 | A | 7/1995 | Sawdon | |
| 5,435,049 | A | 7/1995 | Sawdon | |
| 5,479,687 | A | 1/1996 | Sawdon | |
| 5,509,291 | A | 4/1996 | Nilsson et al. | |
| 5,653,140 | A * | 8/1997 | West | B25B 27/146 72/407 |
| 5,727,302 | A | 3/1998 | Sawdon | |
| 5,737,819 | A | 4/1998 | Sawdon et al. | |
| 5,787,617 | A | 8/1998 | Testa | |
| 5,860,265 | A | 1/1999 | Knudson et al. | |
| 5,878,617 | A * | 3/1999 | Parker | B21D 39/025 72/409.12 |
| 5,927,028 | A | 7/1999 | Rossi | |
| 5,984,563 | A | 11/1999 | Wu | |
| 6,070,449 | A * | 6/2000 | Vachon | B21D 39/031 72/409.12 |
| 6,092,270 | A | 7/2000 | Sawdon | |
| 6,115,898 | A | 9/2000 | Sawdon | |
| 6,212,932 | B1 * | 4/2001 | Parker | B21D 39/03 72/325 |
| 6,240,614 | B1 | 6/2001 | Kojima et al. | |
| 6,308,402 | B1 | 10/2001 | Ellis | |
| 6,397,469 | B2 * | 6/2002 | Parker | B21D 39/03 72/326 |
| 6,760,962 | B2 | 7/2004 | Seamons | |
| 6,892,918 | B2 * | 5/2005 | Purser | B23D 17/06 83/DIG. 2 |
| 6,938,452 | B2 | 9/2005 | Rudolph et al. | |
| 6,990,781 | B2 | 1/2006 | Sundstrom | |
| 7,021,108 | B2 | 4/2006 | Bodwell | |
| 7,100,373 | B2 * | 9/2006 | Oide | B23D 15/14 30/228 |
| 7,121,307 | B2 * | 10/2006 | Nasiatka | B65B 13/345 140/153 |
| 7,353,584 | B2 | 4/2008 | DeFreese et al. | |
| 7,434,314 | B2 * | 10/2008 | Morton | B21D 39/021 72/325 |
| 7,434,441 | B2 * | 10/2008 | Frenken | B21D 39/048 72/409.1 |
| 7,484,397 | B2 | 2/2009 | Coelho et al. | |
| 7,621,165 | B2 * | 11/2009 | Boltz | B21D 39/034 72/325 |
| 7,634,859 | B2 * | 12/2009 | Amherd | B23D 23/00 30/228 |
| 7,845,132 | B2 | 12/2010 | Morton | |
| 7,937,838 | B2 * | 5/2011 | Patton | A62B 3/005 30/228 |
| 8,104,156 | B2 * | 1/2012 | Morton | B21D 39/021 29/243.58 |
| 8,191,223 | B2 * | 6/2012 | Mobley | B25B 27/146 72/453.16 |
| 8,407,875 | B2 * | 4/2013 | Gray | B21F 15/00 72/409.12 |
| 8,522,830 | B2 * | 9/2013 | Barlasov | B65B 13/345 72/409.11 |
| 8,667,656 | B1 * | 3/2014 | Morton | B21D 39/034 72/409.12 |
| 10,343,227 | B2 * | 7/2019 | Frenken | B23D 17/02 |
| 2001/0039704 | A1 * | 11/2001 | Parker | B21D 39/03 29/33 R |
| 2002/0144534 | A1 * | 10/2002 | Mackenzie | H01R 43/0421 72/450 |
| 2004/0093925 | A1 | 5/2004 | Bodwell | |
| 2008/0000062 | A1 | 1/2008 | Boltz | |
| 2008/0028595 | A1 | 2/2008 | DeFreese et al. | |
| 2009/0044392 | A1 | 2/2009 | Morton | |

(56) References Cited

U.S. PATENT DOCUMENTS

2011/0041306 A1    2/2011   Morton
2013/0074434 A1    3/2013   Wiens

FOREIGN PATENT DOCUMENTS

| EP | 0841139 A2 | 4/1997 | | |
|----|------------|--------|---|---|
| WO | 2009058123 | 5/2009 | | |
| WO | WO-2019023810 A1 * | 2/2019 | ............ | B23D 29/00 |

OTHER PUBLICATIONS

International Preliminary Report on Patentability dated Aug. 13, 2019 for International Patent Application No. PCT/US18/17670.

* cited by examiner

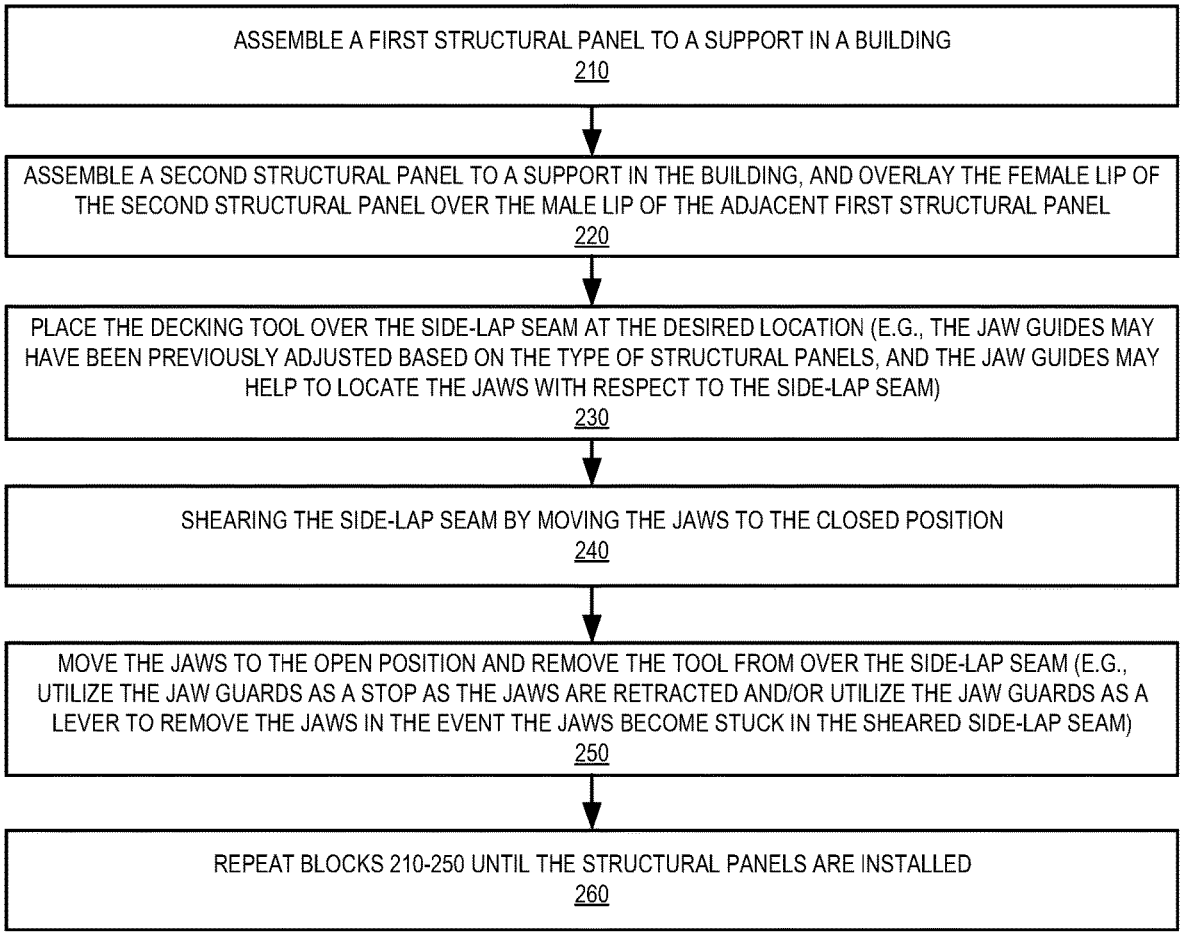

DECKING TOOL

CROSS REFERENCE AND PRIORITY CLAIM UNDER 35 U.S.C. § 119

The present Application for a Patent claims priority to U.S. Provisional Patent Application Ser. No. 62/457,922 entitled "Decking Tool" filed on Feb. 12, 2017 and assigned to the assignees hereof and hereby expressly incorporated by reference herein.

FIELD

This application relates generally to the field of tools used in the installation of decking, and more particularly tools used for creating structural wall, floor, and roof panel systems.

BACKGROUND

Structural wall, floor, or roof panels (collectively described herein as "structural panels," "fluted panels" or "structural fluted panels") are used in commercial and industrial construction, and in some cases residential construction. Structural panels may be typically manufactured from steel sheets, which may or may not be coiled. In order to increase the structural strength and the stiffness of the individual steel sheets, structural panels with longitudinal flutes are formed from the steel sheets via roll forming, break forming, bending, stamping, or other like processes. The structural panels are secured to each other in order to form a structural panel system when installed (e.g., wall system, floor systems, roof system, or combination thereof). In order to couple the structural panels together a tool may be utilized to shear the standing side-lap seam formed from adjacent structural panels. The structural panels are also connected to load resisting structural support members of a building, such as studs, joists, support beams, or the like to create the structural panel system.

BRIEF SUMMARY

Structural panels utilized within a structural panel system of a building typically include longitudinal flutes (e.g., upper flange, lower flange, and webs that form a single flute) that extend longitudinally along the length of the structural panel in order to provide structural strength to the panels, and thus, to the structural panel system and building. The structural panels typically comprise two edges and two ends. The edges of structural panels extend parallel with the longitudinal flutes, while the ends of the structural panel extend transverse to the longitudinal flutes. Consequently, one edge of the structural panels may be described as a "first edge" (or a "first side") while the second edge of the structural panels may be described as a "second edge" (or a "second side"). The ends of the structural panels may be described as a "first end" and a "second end."

One edge of the structural panel typically includes a portion that extends generally perpendicular with, and away from, the installed plane of the structural decking (e.g., upwardly-extending), which may be described as a male lip. The other panel edge typically includes a portion that is U-shaped, V-shaped, or has another like channel, and extends generally perpendicular with, and is open toward, the installed plane of the structural decking (e.g., downwardly-extending), which may be described as a female lip. When two such structural panels are placed side-by-side across supports, the female lip is engaged over, or overlapped with, the male lip of the adjacent structural panel to interlock the edges of adjacent structural panels, thus forming a side-lap seam. This side-lap seam must then be properly secured to prevent the edge of one panel from slipping longitudinally relative to the edge of the adjacent panel, and to prevent perpendicular (e.g., out-of-plane) separation of the panels that can result from loading perpendicular to the plane of the panels due to wind, earthquakes, concrete pours, and the like. The side-lap seam may be secured through the use of a side-lap seam joint (otherwise described as a side-lap seam coupling or connection), formed through the use of a coupling (e.g., shearing, welding, fasteners, or the like). In one instance a decking tool may be utilized to shear the side-lap seam to create a side-lap seam joint.

The present invention relates to a tool for forming a joint in an interlocking side-lap seam formed between first and second structural decking panels. The decking tool may include a frame, an actuator, and arms with jaws, wherein the actuator forms a structural component of the decking tool and is located between the frame and the arms with the jaws. Moreover, the decking tool may further comprise one or more shields and jaw guards. The one or more shields may cover at least a portion of at least one side of the actuator (e.g., the piston of the actuator, or the like) and/or the arms in order to protect the actuator and arms. The one or more jaw guards may be utilized with or without the shields, and may or may not be integral with the shields. The one or more jaw guards have a number of benefits, such as protecting the jaws, positioning the jaws around the side-lap seam to create uniform shearing, for use as a lever to help remove the jaws from the side-lap seam after shearing (e.g., the jaws guards press against the side-lap seam to help free the jaws), and to prevent separation of the side-lap seam when the jaws retract from the sheared side-lap seam (e.g., prevent the sheared side-lap seam from being pulled apart). Moreover, in some embodiments of the invention the jaw guards may be adjustable in order to accommodate the preference of the installer and/or gage of the structural decking.

Embodiments of the invention comprise a decking tool. The decking tool comprises a frame, a first arm having a first jaw, and a second arm having a second jaw, and wherein the second arm is operatively coupled to the first arm. The decking tool further comprises an actuator operatively coupled to the frame and the first arm or the second arm. The decking tool also comprises a shield operatively coupled to the actuator or the frame, wherein the shield covers at least a portion of the first arm or the second arm on at least one side.

In further accord with embodiments of the invention, the decking tool further comprises one or more jaw guards operatively coupled to the shield, the first jaw, or the second jaw, wherein the one or more jaw guards cover at least a portion of the first jaw or the second jaw on at least one side of the decking tool.

In other embodiments of the invention, the one or more jaw guards are integrally formed with and extend from the shield.

In still other embodiments of the invention, the one or more jaw guards are removeably coupled to the shield.

In yet other embodiments of the invention, the one or more jaw guards are adjustable to account for steel decking of different gauges.

In further accord with embodiments of the invention, the shield comprises a first shield portion and a second shield portion, wherein the first shield portion and the second shield portion are located on opposing sides of the first jaw and the second jaw, and wherein the first shield portion and the second shield portion cover the first arm and the second arm.

In other embodiments of the invention, the shield comprises a shield slot and wherein the first arm or the second arm are operatively coupled to the shield slot.

In still other embodiments of the invention, the decking tool further comprises a first linkage operatively coupled to the first arm and the actuator, and a second linkage operatively coupled to the second arm and the actuator.

In yet other embodiments of the invention, the actuator further comprises a piston, and wherein the first linkage and the second linkage are operatively coupled to the piston.

In further accord with embodiments of the invention, the frame comprises a frame support that is at least partially hollow. Moreover, the decking tool further comprises a control, a supply conduit operatively coupled to the control and the actuator, wherein the supply conduit is at least partially encased by the frame support, and wherein the control is used to activate or deactivate the actuator.

Other embodiments of the invention comprise a decking tool. The decking tool comprises a frame, a first arm having a first jaw, a second arm having a second jaw, wherein the second arm is operatively coupled to the first arm. The decking tool further comprises an actuator operatively coupled to the frame and the first arm or the second arm. The decking tool also comprises one or more jaw guards operatively coupled to the first arm or the second arm, and wherein the jaw guard covers at least a portion of the first jaw or the second jaw.

In further accord with embodiments of the invention, the decking tool further comprises a shield operatively coupled to the actuator or the frame, wherein the shield covers at least a portion of the first arm or the second arm.

In other embodiments of the invention, the shield comprises a first shield portion and a second shield portion, wherein the first shield portion and the second shield portion are located on opposing sides of the first jaw and the second jaw, and wherein the first shield portion and the second shield portion cover the first arm and the second arm.

In still other embodiments of the invention, the shield comprises a shield slot and wherein the first arm or the second arm are operatively coupled to the shield slot.

In yet other embodiments of the invention, the one or more jaw guards operatively coupled to the first jaw or the second jaw through the shield.

In further accord with embodiments of the invention, the one or more jaw guards are integrally formed with and extend from the shield.

In other embodiments of the invention, the one or more jaw guards are removeably coupled to the shield.

In still other embodiments of the invention, the one or more jaw guards are adjustable to account for steel decking of different gauges.

In yet other embodiments of the invention, the decking tool further comprises a first linkage operatively coupled to the first arm and the actuator, a second linkage operatively coupled to the second arm and the actuator, wherein the actuator further comprises a piston, and wherein the first linkage and the second linkage are operatively coupled to the piston.

In further accord with embodiments of the invention, the frame comprises a frame support that is at least partially hollow. Moreover, the decking tool further comprises a control, a supply conduit operatively coupled to the control and the actuator, wherein the supply conduit is at least partially encased by the frame support, and wherein the control is used to activate or deactivate the actuator.

To the accomplishment of the foregoing and the related ends, the one or more embodiments of the invention comprise the features hereinafter fully described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF DRAWINGS

The foregoing and other advantages and features of the invention, and the manner in which the same are accomplished, will become more readily apparent upon consideration of the following detailed description of the invention taken in conjunction with the accompanying drawings, which illustrate embodiments of the invention and which are not necessarily drawn to scale, wherein:

FIG. 7 illustrates a process flow for utilizing the decking tool to install structural decking, in accordance with embodiments of the invention.

DETAILED DESCRIPTION

Figure 1:
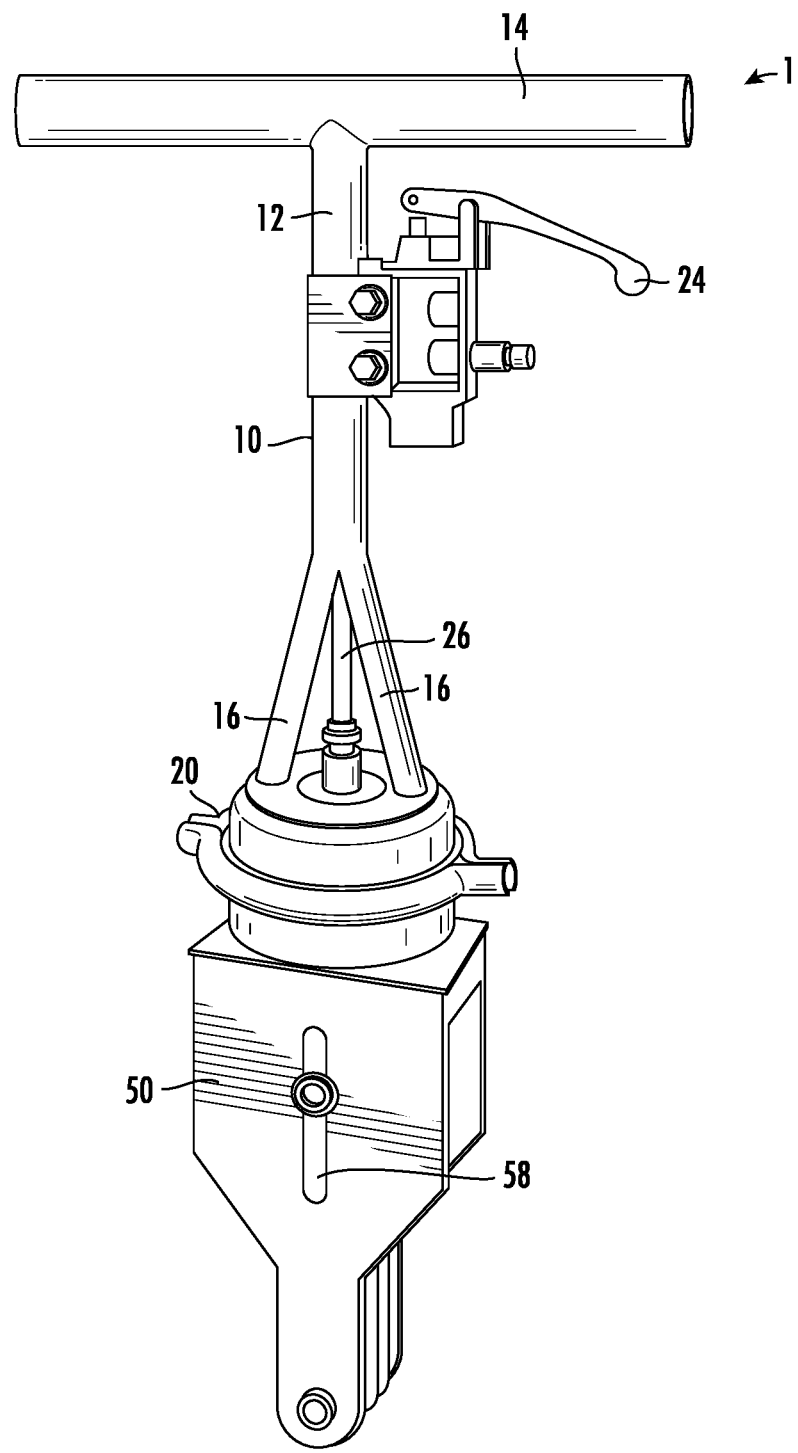
FIG. 1 illustrates a perspective view of a decking tool, in accordance with embodiments of the invention.

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

FIGS. 1 through 5 illustrate embodiments of a decking tool 1. The decking tool 1 generally comprises a frame 10, an actuator 20, arms 30, jaws 40, shields 50, and/or jaw guards 60. The frame 10 generally comprises a support frame 12 operatively coupled to a handle 14. In some embodiments the frame 10 may be a hollow bar, as illustrated; however, it may be any type of structure, or combination of structures, including a solid bar. It should be understood that the cross-section of at least a portion of the frame 10 may be any shape, such as but not limited to circular, oval, triangular, square, rectangular, or any other shape including any polygonal shape or any other shaped frame. In some embodiments the support frame 12 is a split hollow tube and includes split frame legs 16, as illustrated in FIGS. 1 through 5. The support frame 12 may be split in any number of frame legs 16 (e.g., one, two, three, four, or the like). The split frame legs 16 may provide improved support when operatively coupled to the actuator 20 by, among other things, providing a plurality of contact points between the frame 10 and the actuator 20. In some embodiments, the frame legs 16 may comprises separate legs that may or may not be removeably operatively coupled to the frame 10. In some embodiments the support frame 12 is operatively coupled to a support mount 18 (e.g., a support mount plate as illustrated in the figures). The support mount 18 is operatively coupled to the support frame legs 16, such as through a welded connection, fastener connection, or other like connection. As illustrated in the figures, the support frame 12 is operatively coupled to a first surface 120 of the actuator 20 through the use of the support mount 18 connected through the use of fasteners (e.g., screws, bolt, studs, nuts, rivet, pins, or the like). In other embodiments the support frame 12 may be operatively coupled to another surface of the actuator 20 (e.g., circumferential surface, or the like), or combination of surfaces, or other structures operatively coupled to the actuator 20.

Figure 2:
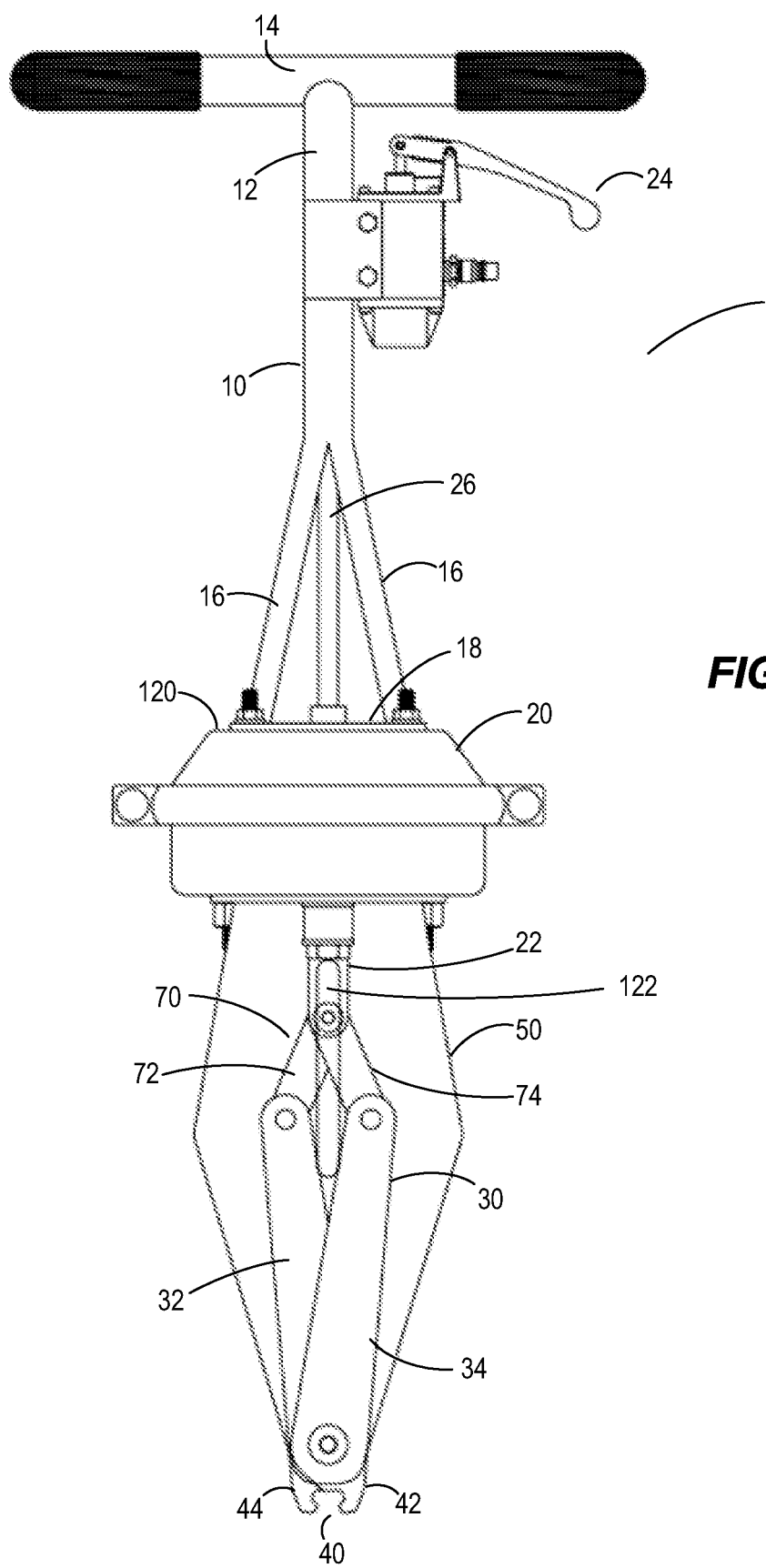
FIG. 2 illustrates a front view of a decking tool, in accordance with embodiments of the invention.
Figure 3:
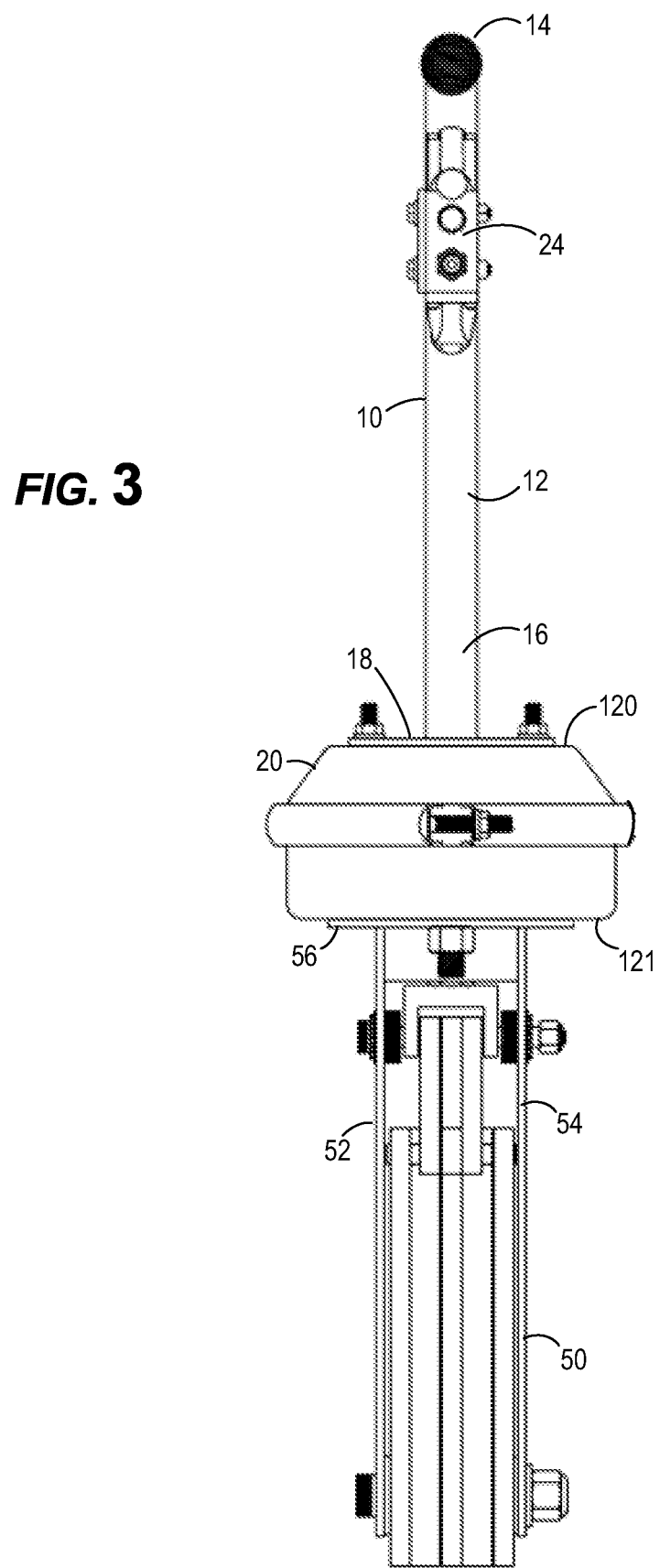
FIG. 3 illustrates a side view of the decking tool of FIG. 2, in accordance with embodiments of the invention.

The actuator 20 may be operatively coupled to the frame 10 as discussed above, as well as operatively coupled to the arms 30, which will be described in further detail below. The actuator 20 may be any pneumatic, hydraulic, electrical, or other like actuator that provides a force (e.g., compressive, tension, moment, or other like force) in order to open and close jaws 40, which will be discussed in further detail later. The actuator 20 may include a piston 22 that extends and retracts in order to actuate one or more of the arms 30 which in turn moves the one or more jaws into and out of open and closed positions, which will also be described in further detail below. The actuator 20 may be operatively coupled to a control 24 (e.g., switch, button, knob, lever, or the like) that activates and/or deactivates the actuator 20, which actuates the piston 22. The actuator 20 may be operatively coupled to a supply conduit 26 that is utilized to provide the pneumatic, hydraulic, or other like power to the actuator 20. In some embodiments of the invention the supply conduit 26 may be at least partially, or completely, covered by the frame 10 (e.g., the support frame 12). For example, the supply conduit 26 may be inserted through the support frame 12. The supply conduit 26 may be operatively coupled to the control 24 and an external supply conduit (not illustrated) and/or the actuator 20. When activated, the control 24 may supply and/or prevent the operation of the actuator 20 by providing or preventing the flow of fluid (e.g., air, hydraulic fluid, or the like) from the external conduit to the supply conduit 26, and to the actuator 20. The piston 22 may be any type of rod, shaft, bar or other suitable type of object of any shape. In some embodiments, as illustrated in FIG. 2 the piston may have slot 122 that allows for the adjustable coupling of the arms 30 and/or linkages 70. For example, as illustrated in FIG. 2 the proximal ends of the linkages are operatively coupled to the piston 22 (e.g., piston aperture 122, such as a hole or a slot, or the like) through the use of a fastener (e.g., screw, bolt, stud, nut, rivet, pin, or the like). The linkages 70 may have linkage apertures (e.g., holes, slots, or the like) and the piston 22 may be adjustably coupled to the linkages 70 through the use of the linkage apertures and/or the piston aperture 122 (not illustrated).

As illustrated in FIGS. 2-5, the actuator 20 may be operatively coupled to one or more arms 30. The one or more arms 30 may include a first arm 32 and a second arm 34. It should be understood that one or more of the arms 30 may be stationary and/or one or more of the arms 30 may be moveable. However, it should be understood regardless of the number of arms 30 (e.g., two or more arms) at least one of the arms 30 are moveable. In the illustrated embodiment both the first arm 32 and the second arm 34 are moveable. As illustrated in the figures, the first arm 32 and the second arm 34 are operatively coupled (e.g., hinged using a pin or other fastener) at the distal ends of each of the arms 30. The proximal ends of the first arm 32 and the second arm 34 are operatively coupled (e.g., hinged using a pin or other fastener) to linkages 70, such as a first linkage 72 and a second linkage 74, respectively. The proximal ends of the first linkage 72 and second linkage 74 are operatively coupled to the piston 22 of the actuator 20 and/or each other. The first arm 32 is operatively coupled to a first jaw 42 (e.g., integral with or removeably coupled to the arm), while the second arm 34 is operatively coupled a second jaw 44 (e.g., integral with or removeably coupled to the arm). It should be understood that the ratio and geometry of the arms 30 and linkages 70 may vary in order to provide improved force for shearing the side-lap seam. In some embodiments, the length of the linkages 70 with respect to the arms 30 may be in the ratio of 1:1.5, 1:1.75, 1:2, 1:2.25, 1:2.5, 1:2.75 1:3, 1:3.25, 1:3.5, 1:3.75, 1:4, 1.4.25, 1:4.5, 1:4.75, 1:5, or any ratio that falls within or outside of these ratios, or may be in any range of ratios that fall within, outside of, or overlap any of the recited ratios.

Figure 4:
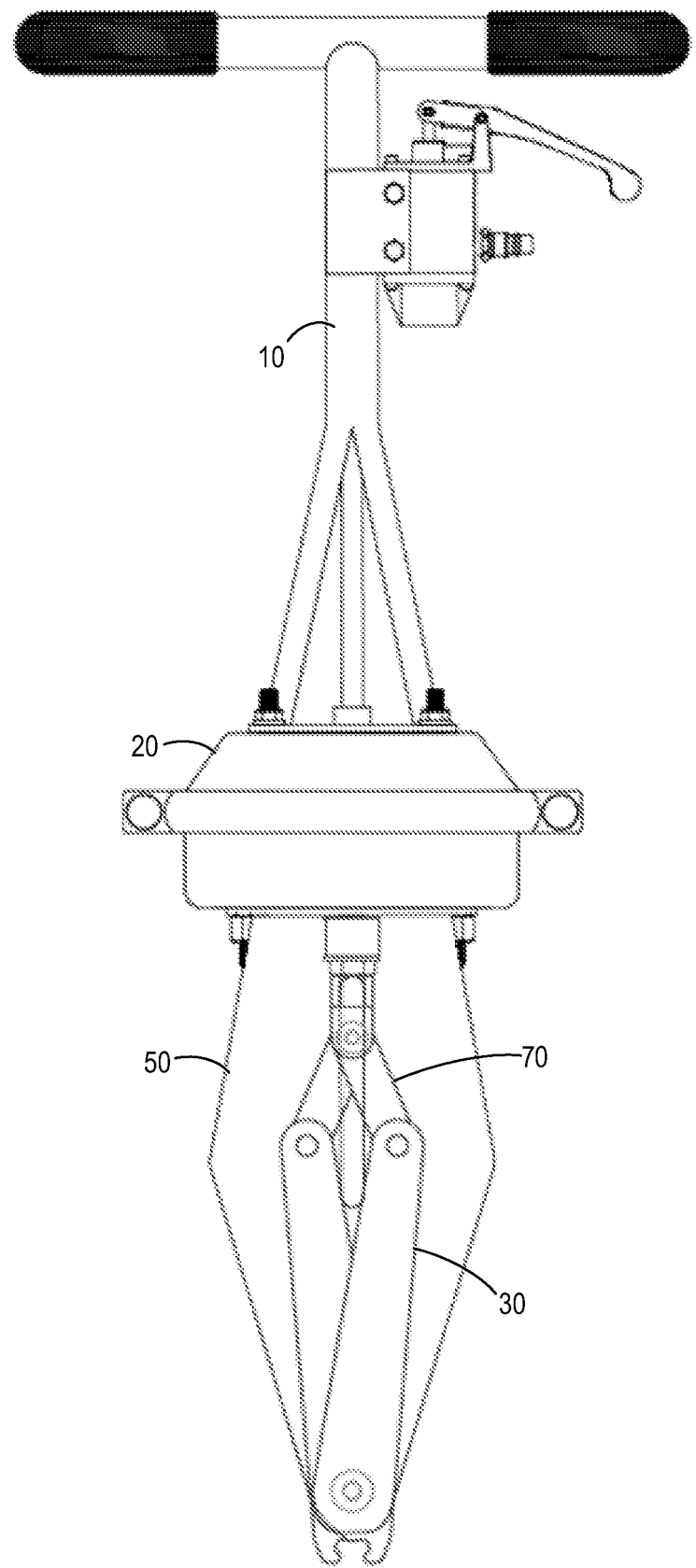
FIG. 4 illustrates a front view of the decking tool with the jaws in the open position, in accordance with embodiments of the invention.
Figure 5:
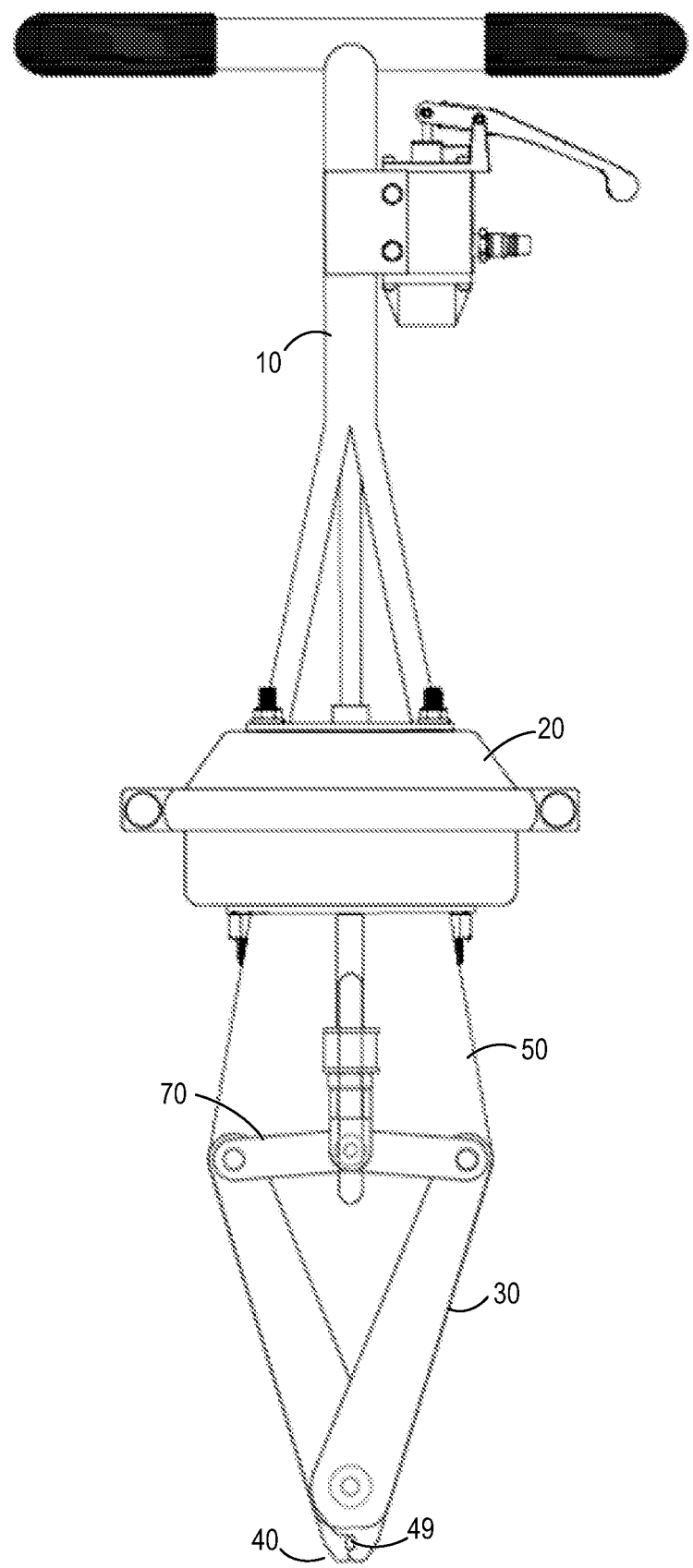
FIG. 5 illustrates a front view of the decking tool with the jaw in the closed position, in accordance with embodiments of the invention.

When the jaws 40 are in the open position the linkages 70 and the arms 30 may form any type of shape; however, in some embodiments, as illustrated in the Figures, the linkages 70 and the arms 30 form a generally quadrilateral shape (e.g., kite shaped with two pairs of equal sides, or the like), as illustrated in FIG. 4, and when the jaws are in a closed position a generally triangular shape, as illustrated in FIG. 5. As illustrated in FIG. 4, the linkages may have an angle at the proximal end of about 50 degrees, or otherwise may have an angle of 30, 32, 34, 36, 38, 40, 42, 44, 45, 46, 47, 48, 49, 51, 52, 53, 54, 55, 56, 58, 60, 62, 64, 66, 68, 70, or the like degrees. As illustrated in FIG. 4, the arms 30 at the distal end may have an angle of about 20 degrees, or otherwise may have an angle of 4, 6, 8, 10, 12, 14, 15, 16, 17, 18, 19, 21, 22, 23, 24, 25, 26, 28, 30, 32, 34, 36, 38, 40, or the like degrees. Moreover, at the connection between the linkages 70 and the arms 30 the angles may be about 145 degrees, or otherwise be 120, 122, 124, 126, 128, 130, 132, 134, 136, 138, 140, 141, 142, 143, 144, 146, 147, 148, 149, 150, 152, 154, 156, 158, 160, 162, 164, 166, 168, or other like degrees.

As illustrated in FIG. 5, when the jaws 40 are in the closed position the first linkage 72 and the second linkage 74 may be generally in series with each other and generally along the same plane. In some embodiments the angle between the linkages at the proximal ends may be about 170 degrees, or otherwise be 150, 152, 154, 156, 158, 160, 162, 164, 165, 166, 167, 168, 169, 171, 172, 173, 174, 175, 176, 178, 180, 182, 184, 186, 188, 190, 195, 200, or the like degrees. Moreover, in the closed position the angle between the arms 30 at the distal end may be about 40 degrees, or otherwise be 20, 22, 24, 26, 28, 30, 32, 34, 35, 36, 37, 38, 39, 41, 42, 43, 44, 45, 46, 48, 50, 52, 54, 56, 58, 60, or the like degrees. It should be understood for any of the angles discussed herein the angles may be within or outside of the stated angles, or may be in any ranges that fall within, outside of, or overlap any of the recited angles.

The jaws 40 may be any type of jaw, such as a blade and die (e.g., multiple blades, or other like die), multiple blades on each jaw, other like configuration. In the illustrated embodiment the first jaw 42 and the second jaw 44 may include a total of three blades. However, in some embodiments the first jaw 42 and the second jaw 44 may include a total of two, four, five, or like number of blades. In some aspects of the invention one or more of the jaws 40 include a jaw tip 48 (e.g., a pointed, rounded, bulb, or other like tip). The one or more jaw tips 48 may project (e.g., extend) from one or more of the jaws 40 such that when they are in a closed position the jaws 40 form a cavity 49. It should be understood that the jaws 40 and/or the jaw tips 48 may deform and/or shear a side-lap seam in order to secure the structural panels together.

The decking tool 1 may further comprise one or more shields 50 that cover at least a portion of one side of the arms 30 and/or linkages 70. As illustrated in the figures, it should be understood that the one or more shields 50 may comprise of a first shield portion (e.g., a first shield plate 52, or the like) and a second shield portion (e.g., a second shield plate 54, or the like), and a shield mount 56. In some embodiments, the one or more shields may further comprise a third portion and a fourth portion (not illustrated). The first shield portion and the second shield portion may be located on opposite sides of the arms 30 in the same plane as the movement of the arms 30 (e.g., opposing shields faces). The third shield portion and the fourth shield portion may be located on opposite edges of the arms 30 perpendicular to the plane of the movement of the arms (e.g., opposing shield edges). As illustrated in the Figures, the first shield plate 52 and the second shield plate 54 may be operatively coupled to the arms 30 (e.g., through a hinged pin at the distal ends of the arms 30, one or more projections extending from one or more of the arms 30 or linkages, other type of fastener, or the like), to the actuator 20 (e.g., through the shield mount 56 operatively coupled to a second side 121 of the actuator 20, an edge of the actuator 20, the first side 120 of the actuator 20, or the like) or the frame 10 (e.g., the support frame 12, one or more of the split frame legs 16, or the like). In other embodiments, the shield 50 may be a housing or other like shield that covers at least a portion of the arms 30 and/or linkages 70. As such, it should be understood that the one or more shields 50 may be a single shield or multiple shield portions that are removeably operatively coupled to together to allow for assembly and/or disassembly of portions of the one or more shields 50 for accessing the components of the decking tool 1, for accounting for different side-lap seam configurations (e.g., as will be discussed with respect to the jaw guards 60 in further detail later), or the like.

The one or more shields 50 may partially or completely cover the arms 30 and/or linkages 70. In some embodiments of the invention the one or more shields 50 may help secure the arms 30 and/or linkages 70, and thus help guide the arms 30 and/or linkages 70 as they are actuated. As such, the one or more shields 50 may provide additional structural support and/or help move the linkages 70 and/or arms 30 along the same path as they are actuated by confining them within the planes defined by the one or more shields 50, or portions thereof. Moreover, the one or more shields 50 may prevent objects from being caught in the arms 30 or jaws 40 so as to prevent damage to the objects and/or the decking tool 1.

It should be further understood that in some embodiments of the invention, the fasteners that couple the linkages 70 to the piston 20 and/or the linkages 70 to the arms 30 may be at least partially covered on at least one side and contained by the one or more shields 50, such that the one or more shields 50 protect the fasteners from external elements and/or help to hold the fasteners in place (e.g., with respect to pinned connections, or the like). In other embodiments of the invention, the one or more shields 50 (e.g., the first shield plate 52 and/or the second shield plate 54) may comprise one or more shield apertures (e.g., slot 58, or other like aperture). The one or more shield slots 58 may be operatively coupled to the proximate ends of the linkages 70 and/or the piston 22, and/or the distal ends of the arms 30 and/or the proximal ends of the linkages 70. The coupling may occur through a coupling, such as a fastener that slides within the one or more shield apertures. The one or more shield apertures (e.g., shield slot 58, or the like) may further provide structural support to the linkages 70 and/or arms 30 as they are actuated; and further help move the linkages 70 and/or arms 30 along the same path as they are actuated by confining the movement only to the path defined by the one or more shield apertures (e.g., one or more shield slot 58).

Figure 6A:
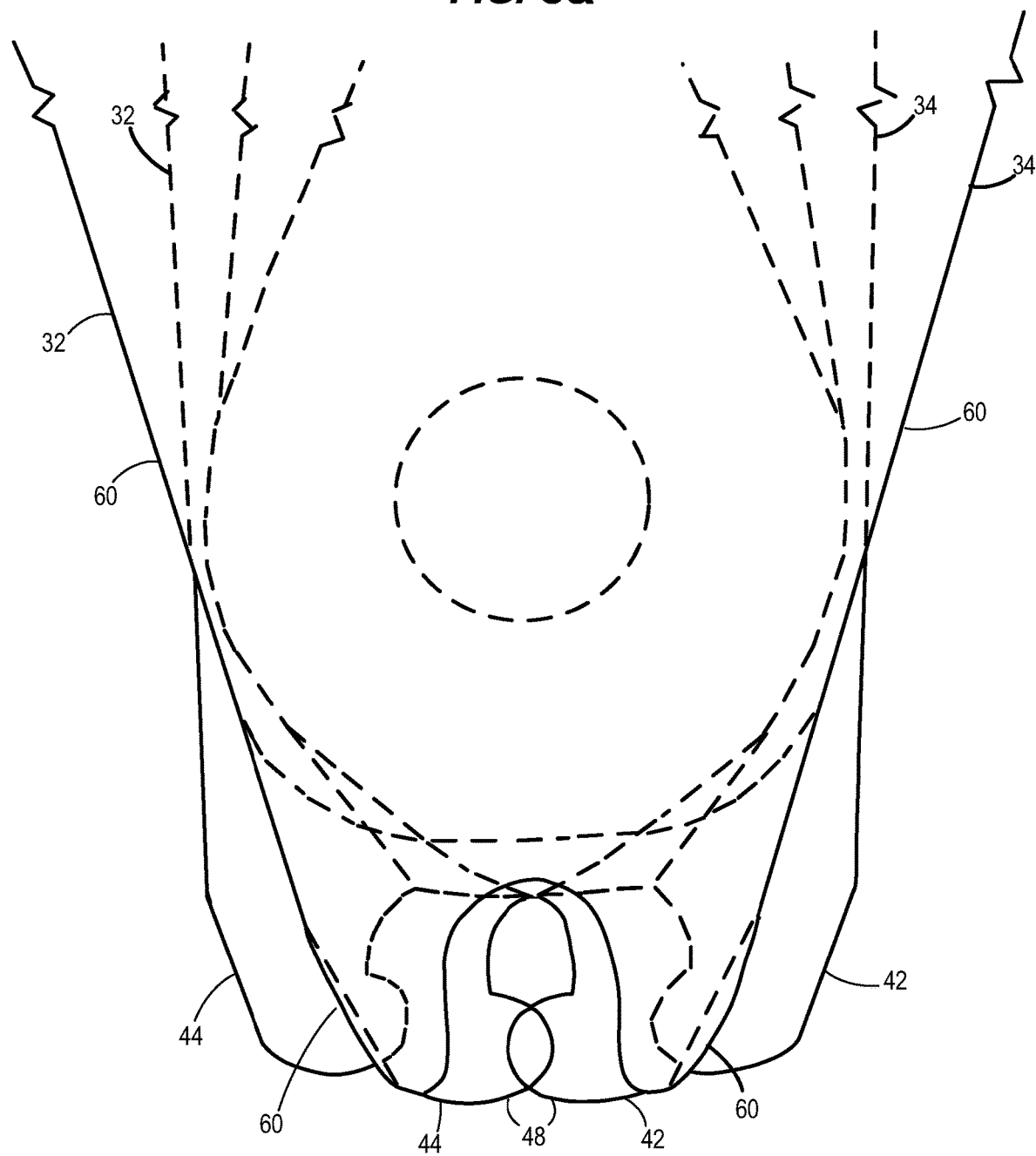
FIG. 6a illustrates a magnified view of the jaws and a jaw guard integral with the shield, in accordance with embodiments of the invention.
Figure 6B:
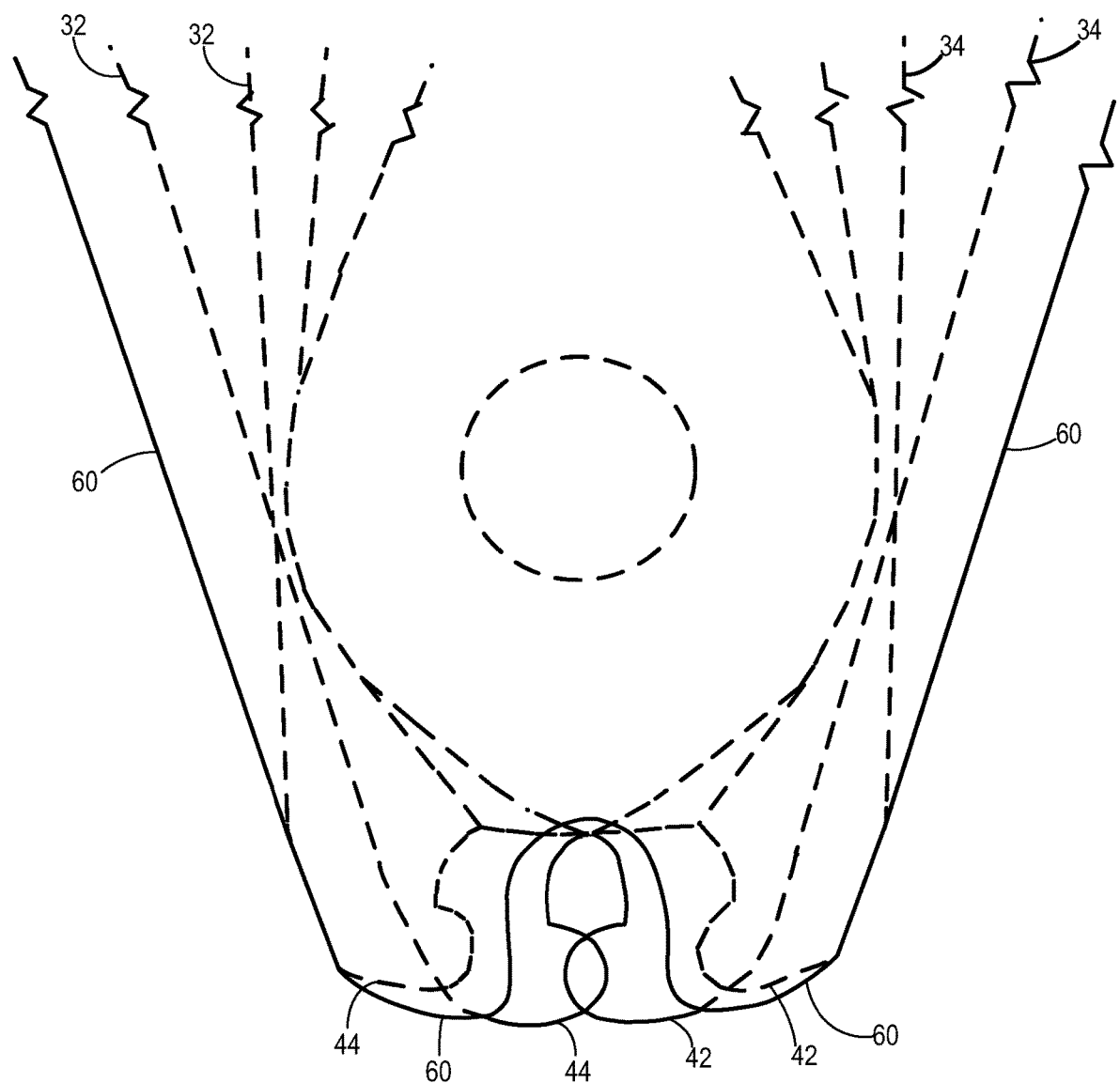
FIG. 6b illustrates a magnified view of the jaws and a jaw guard integral with the shield, in accordance with embodiments of the invention.
Figure 6C:
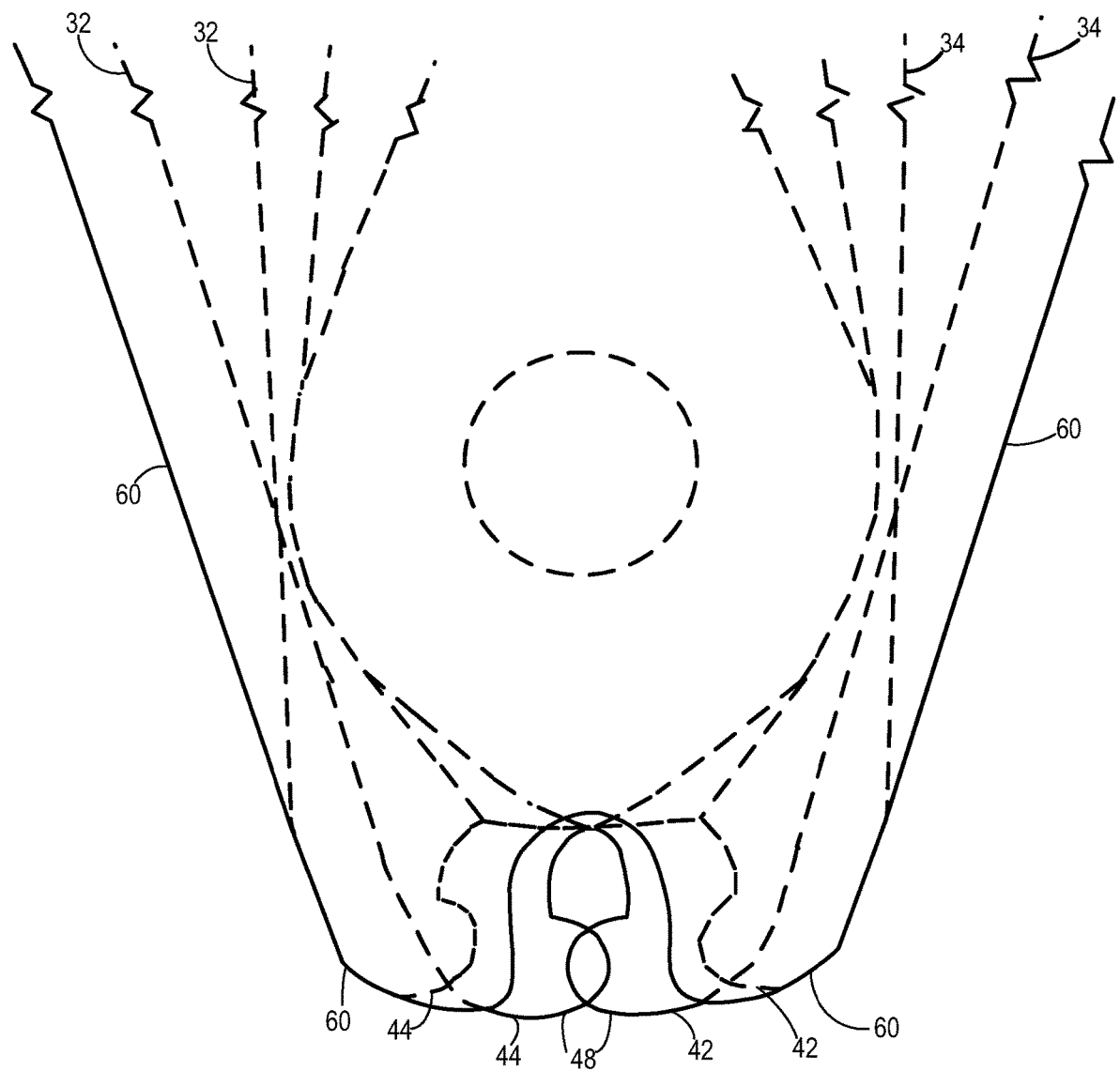
FIG. 6c illustrates a magnified view of the jaws and a jaw guard integral with the shield, in accordance with embodiments of the invention.
Figure 6D:
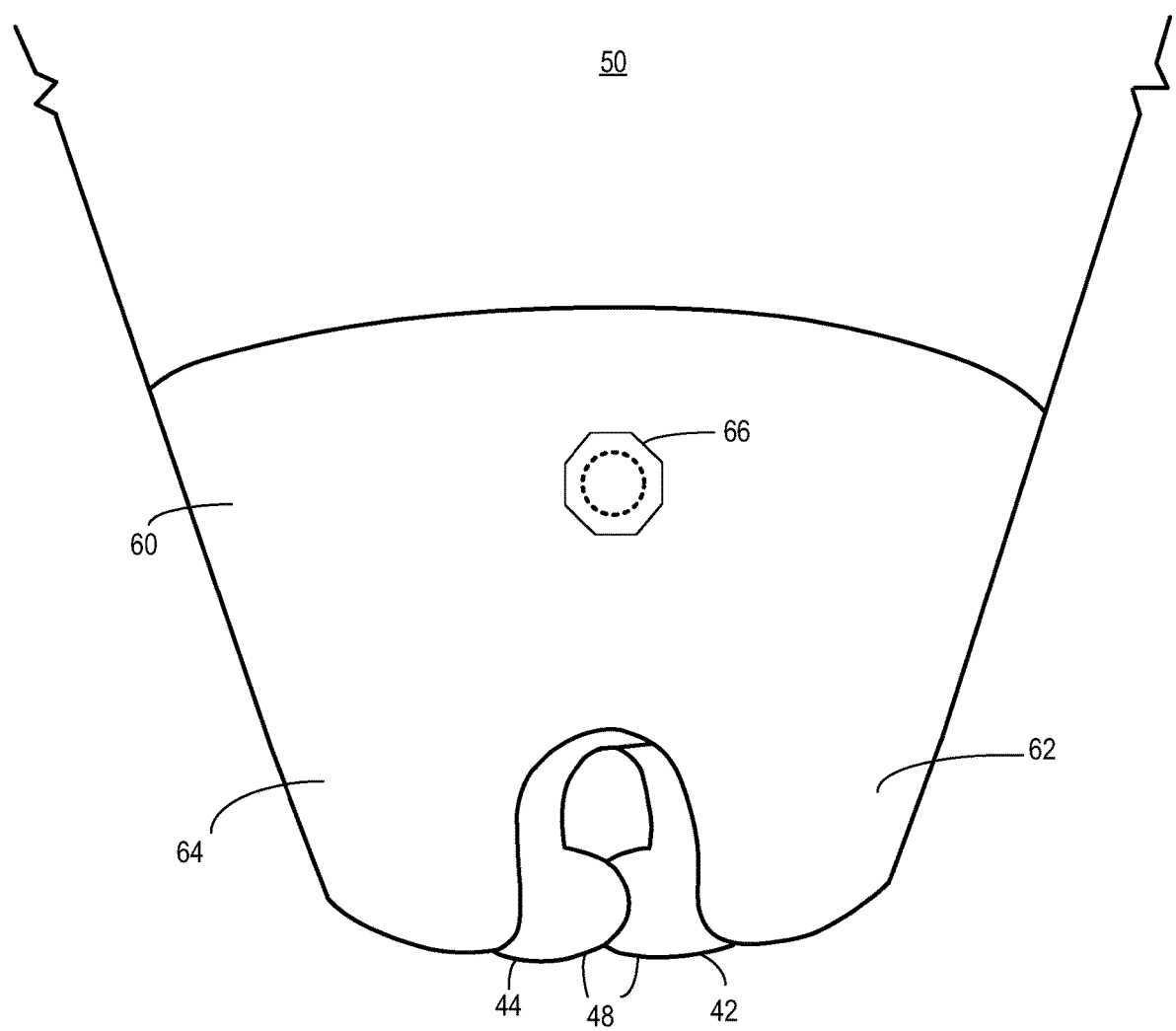
FIG. 6d illustrates a magnified view of the jaws and a single removable jaw guard, in accordance with embodiments of the invention.
Figure 6E:
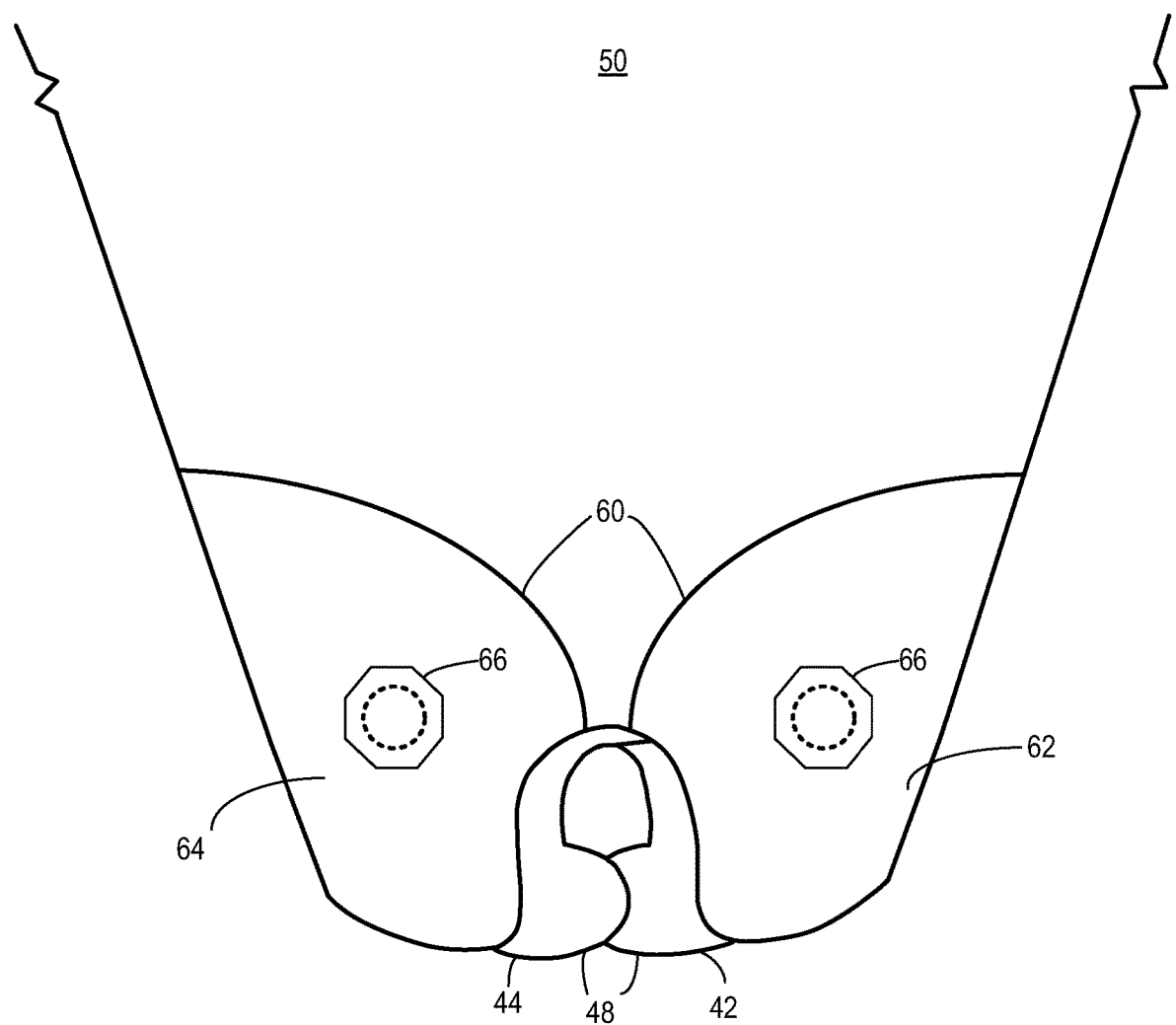
FIG. 6e illustrates a magnified view of the jaws and multiple removable jaw guards, in accordance with embodiments of the invention.

Alternatively, or in addition to, the one or more shields 50, the decking tool 1 may include one or more jaw guards 60. The one or more jaw guards 60 may be utilized with or without the shields 50, and may or may not be integral with the shields 50. As illustrated in FIGS. 6a-6e, the jaw guards 60 may include a first jaw guard 62 that at least partially or completely covers at least one side of the first jaw 42, while the second jaw guard 64 at least partially or completely covers at least one side of the second jaw 44. The jaws guards 60 may be continuous with the shields 50 or be removable from the shields 50. As illustrated by FIG. 6a the one or more jaw guards 60 may completely cover the external outer edges of the jaws 40 when the jaws 40 are in the closed position, but may only partially cover the external outer edges of the jaws 40 when the jaws 40 are in the open position. As illustrated by FIG. 6b the one or more jaw guards 60 may cover at least a portion of one or more jaws 40 when the jaws 40 are in the closed position and in the open position, and may extend past the lower external surfaces of the jaws 40 when the jaws 40 are in the closed position. FIG. 6c, like FIG. 6b illustrates that the one or more jaw guards 60 may cover at least a portion of one or more jaws 40 when the jaws 40 are in the closed position and in the open position, however, unlike FIG. 6b, the jaws guards 60 may not extend past the lower external surfaces of the jaws 40 when the jaws 40 are in the closed position. As illustrated by FIGS. 6d and 6e, the one or more jaw guards 60 may be removeably operatively coupled to the one or more shields 50, and may be a single jaw guard or be multiple jaw guard portions.

It should be understood that the jaw guards 60 are illustrated as being a part of the one or more shields or being operatively coupled to the one or more shields. However, it should be understood in other embodiments of the invention the one or more jaw guards 60 may be operatively coupled to the actuator 20, a portion of the frame 10 (e.g., a portion that may extend down to adjacent the jaws 40), a stationary arm 30 (in the embodiments that include a stationary arm), or the like.

Moreover, in some embodiments of the invention the one or more jaw guards 60 may be adjustable in order to allow for adjustment of the jaw guards 60 depending on the preference of the installer, the gage of the structural decking, the dimensions of the side-lap seam (e.g., changing the location at which the shearing occurs), or the like. For example, in some embodiments of the invention, the jaws guards 60 may be adjusted depending on the thickness of the gauge of the structural decking, and thus, the thickness of the material at the side-lap seam. As such, in some embodiments the adjustability of the one or more jaw guards 60 may be changed based on the size of the side-lap seam, and/or the distance of the side-lap seam from flutes (e.g., ridges) in the structural steel decking. The one or more jaw guards 60 may be adjusted through the use of couplings 66 (e.g., fasteners, such as bolts, pins, or the like, springs, such as leaf springs, or the like, or other any type of coupling features). Additionally, or alternatively, the one or more shields 50 may include guard apertures (not illustrated, such as holes, slots, notches, or the like), through which the one or more jaw guards 60 may be adjusted, removed, added, or the like. For example, a hole or slot may be included in the one or more shields 50, which may be used to attached and/or remove different size jaw guards 60, which may be used to change the location of the attachment of the one or more jaw guards 60, or which may allow the one or more jaw guards 60 to rotate. As such, larger or smaller jaw guards 60 may be used, the jaw guards 60 may be positioned at different locations (e.g., at different positions on the one or more shields 50), the jaw guards 60 may be rotated at different angles, and/or the one or more jaw guards 60 of different shapes may be used. In a specific example, the one or more jaw guards 60 may be adjusted through the use of pre-defined notches in which at least a portion of the jaw guard 60 and/or associated coupling may engage or disengage in order to adjust the one or more jaw guards 60 parallel and/or perpendicular in-plane with the decking (e.g., if the decking tool is in operation and the jaws have received the side-lap seam). Regardless of how the one or more jaw guards 60 are operatively coupled to the decking tool 1, the one or more jaw guards 60 are adjustable.

The one or more jaw guards 60 may provide a number of benefits, such as protecting the jaws 40; helping to position the jaws around the side-lap seam to aid in creating uniform shearing; may act as a lever to aid in removing the jaws 40 from the side-lap seam after shearing by pressing against the side-lap seam so that when the jaws 40 open the seam disengages from the jaws 40; and/or may act to prevent separation of the side-lap seam when the jaws 40 retract from sheared side-lap seam (e.g., prevent the sheared side-lap seam from being pulled apart because the side-lap cannot extend past the jaw guards 60). For example, after the jaws 40 have sheared the side-lap seam the jaws 40 (e.g., potentially the jaw tips 48) may be difficult to pull out of sheared portions of the side-lap seams because of frictional engagement. As such, when the jaws 40 retract to the open position the jaws 40 (e.g., potentially the jaw tips 48) may tend to pull at least a portion of the side-lap seam apart after it has been sheared. The jaw guards 60 provide resistance to aid in preventing the side-lap seam from being pulled past the jaw guards 60 by the retracting movement of the jaws 40 if the jaws (e.g., potentially the jaw tips 48) have become at least partially lodged or stuck within the sheared portions of the side-lap seam.

Figure 8:
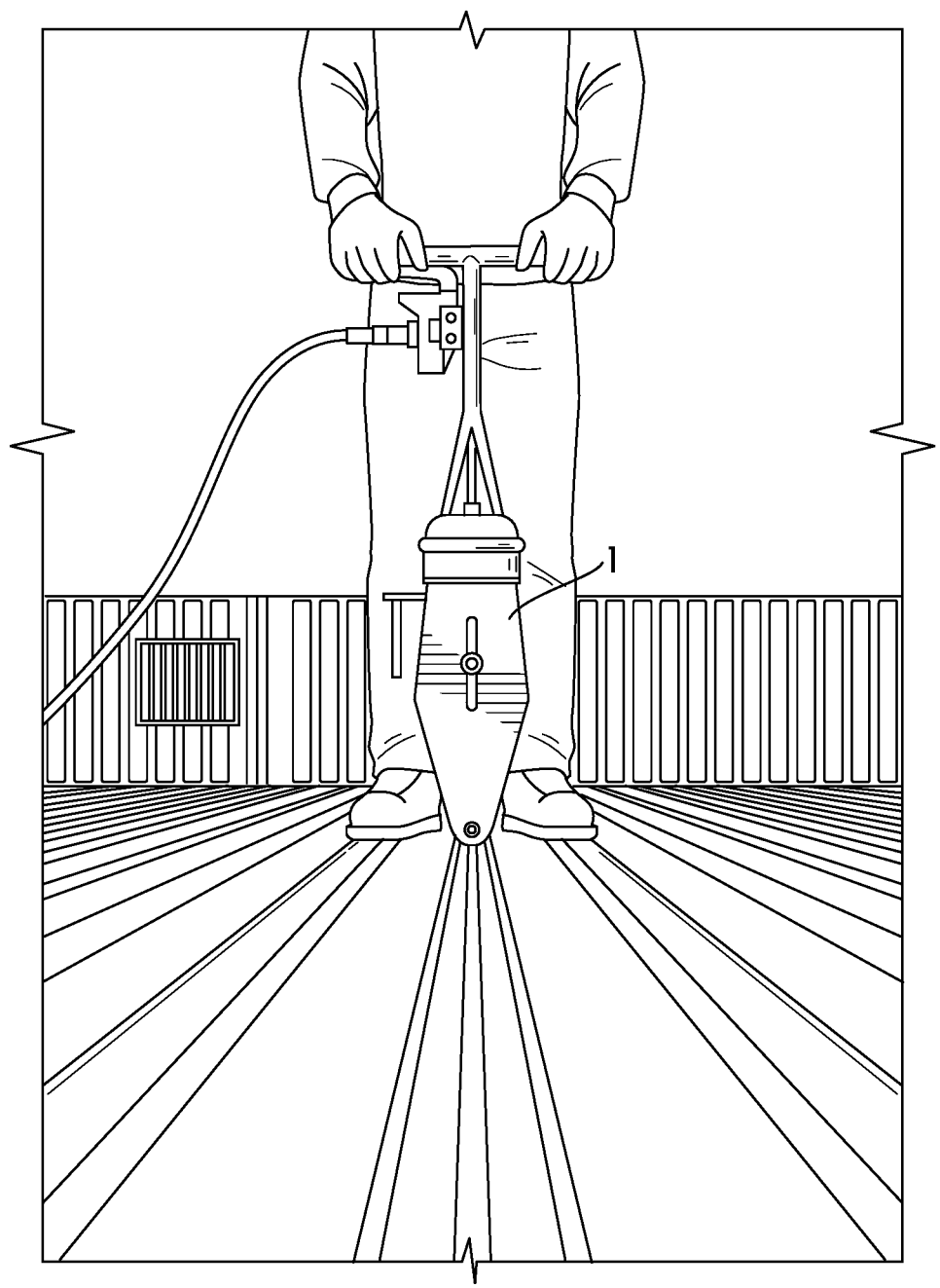
FIG. 8 illustrates a view of the decking tool being used to shear the side-lap seam of the structural decking, in accordance with embodiments of the invention.

FIG. 7, illustrates a method 200 of utilizing the decking tool 1 to assemble adjacent structural decking panels. As illustrated by block 210 in FIG. 7, a first structural panel is assembled in a building structure. For example, the structural panel is secured to one or more supports within the building. As illustrated by block 220, a second structural panel is assembled in a building structure. For example, the female lip of the second structural panel is overlaid onto the male lip of the first structural panel, such that the channel in the female lip at least partially covers the male lip. The structural panels are heavy material, and thus assembly of the panels in some embodiments occurs without having to rotate the panels into place to assemble the side-lap seam. When assembled, gaps may be formed between the male lip and the female lip, which allow for tolerance differences and ease of assembly of the large heavy structural panels. Moreover, the second structural panel is assembled to one or more supports within the building (e.g., using fasteners, or the like). Block 230 of FIG. 7 further illustrates that the decking tool 1 is placed over the side-lap seam of the structural panels at the desired location for a joint. In some embodiments of the invention, one or more jaw guides 60 may be adjusted before the one or more jaws 40 of the decking tool 1 are placed over the side-lap seam. The jaw guides 60 may help to position the jaws 40 (and in some embodiments the jaw tips 48) in the desired location at the side-lap seam (e.g., desired height of the side-lap seam). As such, the jaw guides 60 may prevent shearing the side-lap seam at a location that is near the base or near the top of the side-lap seam, and thus ensure that the sheared portion of the side-lap seam occurs only through both the male lip and female lip (e.g., does not occur in only a portion of the male lip or a portion of the female lip, or in an unwanted location on the side-lap seam). Block 240 of FIG. 7 illustrates that the decking tool 1 is activated (e.g., the control 24 is activated) in order to actuate the piston 22 of the actuator 20. The piston moves the one or more linkages 70, which moves the one or more arms 30 (or just the one or more arms 30 when linkages 70 are not utilized). The arms 30 close the jaws 40 to shear the side-lap seam (or just a single jaw in alternate embodiments). The dimensions and geometry of the arms 30 and linkages 70 previously described with respect to FIGS. 4 and 5 provide improved force at the side-lap seam in order to create improved sheared joints at the side-lap seam and to improve actuation times (e.g., optimized force and optimized timing to increase assembly times). As illustrated by block 250, thereafter, the piston 22 is retracted, which moves the one or more linkages 70 and the one or more arms 30 (or just the one or more arms 30 in alternate embodiments), which in turn retracts the jaws 40 (or a single jaw). If the jaws 40 and/or the jaw tips 48 become lodged or stuck within the sheared portions of the side-lap seam the jaw guides 60 may be utilized as a lever that is forced against the side-lap seam to help to free the jaws 40 and/or jaw tips 48. Moreover, as the jaws 40 and/or jaw tips 60 retract from the sheared side-lap seam, the jaw guides 60 also prevent the jaws and/or jaw tips 60 from pulling apart the portions of the sheared side-lap seam past the jaw guides 60. Block 260 of FIG. 7 illustrates that blocks 210-250 are repeated until the structural panels of the building are installed. For example, adjacent panel edges are operatively coupled through the sheared side-lap seam, and adjacent panel ends are operatively coupled using fasteners in order to create the structural building system. FIG. 8 illustrates a user operating the decking tool to install the structural panels in accordance with the process described with respect to FIG. 7, and in accordance with the decking tool 1 described herein.

It should be understood that "operatively coupled," when used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently and/or integrally coupled together.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more."

What is claimed is:

1. A decking tool, comprising:
   a frame;
   a first arm having a first arm proximal end and a first arm distal end, wherein a first jaw is operatively coupled to the first arm distal end;
   a second arm having a second arm proximal end and a second arm distal end, wherein a second jaw is operatively coupled to the second arm distal end, wherein the second arm is operatively coupled to the first arm;
   an actuator operatively coupled to the frame and the first arm and the second arm; and
   a shield operatively coupled to the actuator, the first arm, and the second arm, wherein the shield covers the first arm and at least a portion of the second arm on at least one side of the decking tool.

2. The decking tool of claim 1, further comprising:
   one or more jaw guards operatively coupled to the shield wherein the one or more jaw guards cover at least a portion of the first jaw or the second jaw on the at least one side of the decking tool.

3. The decking tool of claim 2, wherein the one or more jaw guards are operatively coupled to the shield through an integral coupling.

4. The decking tool of claim 2, wherein the one or more jaw guards are operatively coupled to the shield through a removeable coupling.

5. The decking tool of claim 2, wherein the shield comprises one or more guard apertures, wherein the one or more jaw guards are operatively coupled to the shield through an adjustable coupling, and wherein the one or more jaw guards are adjustable within the one or more guard apertures to account for steel decking of different gauges.

6. The decking tool of claim 1, wherein the shield comprises a first shield portion and a second shield portion, wherein the first shield portion and the second shield portion are located on opposing sides of the first arm and the second arm, and wherein the first shield portion and the second shield portion cover the first arm and the second arm.

7. The decking tool of claim 1, wherein the shield comprises a shield slot and wherein the first arm and the second arm are operatively coupled to the shield with a coupling through the shield slot.

8. The decking tool of claim 1, further comprising:
   a first linkage having a first linkage proximal end and a first linkage distal end, wherein the first linkage distal end is operatively coupled to the first arm proximal end and the actuator;
   a second linkage having a second linkage proximal end and second linkage distal end, wherein the second linkage distal end is operatively coupled to the second arm proximal end and the second linkage proximal end is operatively coupled to the first linkage proximal end and the actuator;
   wherein the shield covers at least a portion of the first linkage and the second linkage.

9. The decking tool of claim 8, wherein the actuator further comprises a piston, and wherein the first linkage and the second linkage are operatively coupled to the piston.

10. The decking tool of claim 1, wherein the frame comprises a frame support that is at least partially hollow, and wherein the decking tool further comprises:
    a control operatively coupled to the frame support;
    a supply conduit operatively coupled to the control and the actuator, wherein the supply conduit is at least partially encased by the frame support; and
    wherein the control is used to activate or deactivate the actuator.

* * * * *